Sept. 19, 1967     L. J. VAN DER PAUW     3,343,105
ELECTRIC DELAY DEVICE WITH POLARIZATION VARIATIONS
IN TRANSDUCERS TO REDUCE ECHO VIBRATIONS
Filed Aug. 25 1966

INVENTOR.
LEO J. VAN DER PAUW
BY
AGENT

United States Patent Office 3,343,105
Patented Sept. 19, 1967

3,343,105
ELECTRIC DELAY DEVICE WITH POLARIZATION VARIATIONS IN TRANSDUCERS TO REDUCE ECHO VIBRATIONS
Leo Johan van der Pauw, Eindhoven, Netherlands, assignor to North American Philips Company, Inc., New York, N.Y., a corporation of Delaware
Filed Aug. 25, 1966, Ser. No. 575,116
Claims priority, application Netherlands, Aug. 26, 1965, 65—11,135
8 Claims. (Cl. 333—30)

ABSTRACT OF THE DISCLOSURE

An electro-mechanical delay line is provided having input and output transducers of a material that has an electromechanical conversion factor dependent upon polarization in the material, and a delay material between the transducers. In order to prevent spurious reflections at the transducers, the polarization of the material of the transducers decreases in a direction parallel to the direction of propagation of mechanical vibrations. The delay material may be unitary with the transducers.

---

Figure 1:
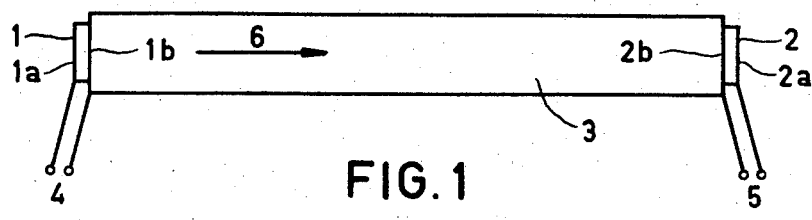

The invention relates to an electric delay device for delaying electrical oscillations which are converted by means of a transducer into mechanical vibrations which pass through a delaying medium and are subsequently again converted into electrical oscillations. The transducer contains a material having an electromechanical conversion factor dependent upon the polarization.

Such devices are used, for example, for delaying television signals, for example, in systems for transmitting colour television signals (NTSC, PAL, SECAM). The television signal is applied to a transducer which converts this electric signal into a corresponding mechanical vibration which passes through the delay medium and is collected either immediately or after being reflected once or several times against the walls of the delay medium by a second transducer in which it is converted again into an electric signal; the time the mechanical vibration requires for passing through the delay medium and impinging on the second transducer determines the delay time of the electric signal produced in the second transducer with respect to the electric signal applied to the first transducer. The problem arises that undesirable reflections may be produced so that the second transducer can be struck by mechanical vibrations which are superimposed on the desired vibrations and therefore give rise to blurring of the desired signal. Several proposals have already been made to eliminate these undesired vibrations by means of suitably arranged damping agents on the walls or inside the delay body itself. The invention has more particularly for its object to reduce the undesired "echo vibrations" produced by the transducer itself. In general, these vibrations cannot be readily suppressed by means of damping material since they have the same direction of propagation as the desired vibrations and can therefore be separated therefrom only with difficulty.

According to the invention, in order to reduce undesired echo vibrations the material of the transducer exhibits a polarization gradually decreasing parallel to the direction of propagation of the mechanical vibrations.

The invention will now be described more fully with reference to the drawing, which shows three embodiments of devices in accordance with the invention.

The device shown in FIG. 1 has an input transducer 1 and an output transducer 2 between which is disposed a delay medium 3. For the sake of simplicity, the delay medium 3 is shown in the form of a long rod in which vibrations can propagate in the longitudinal direction. It is known, however, that such a medium may also have the form, for example, of a polygon or a cylinder, in which case the waves originating from the input transducer strike the output transducer only after being reflected several times. In the latter case, with unchanged dimensions of the device as a whole a considerably longer delay time can be achieved.

The transducers 1 and 2 are provided with metal electrodes having negligible thicknesses which are provided on the front faces and rear faces 1a and 1b, respectively, and 2a and 2b, respectively, of these transducers. The electrodes are connected to input terminals 4 and to output terminals 5, respectively. Electric signals applied to the input terminals 4 are converted with the aid of the transducer 1 into mechanical vibrations which pass through the medium 3 and strike the transducer 2 after a given delay time, in which latter transducer they are converted again into electric output signals at the output terminals 5. The transducers 1 and 2 contain a material having an electromechanical conversion factor dependent upon the polarization, many examples of such materials having been described in literature in the series of titanates, zirconates, tungstenates, niobates and so on; in this connection, very satisfactory results have been obtained, for example, with barium-strontium-titanate and with lead zirconate-titanate.

The invention is based on the following considerations:
If the transducers 1 and 2 have a constant polarization throughout the material, the wave passed through the medium 3 does not constitute a reliable simulation of the electrical oscillation at the terminals 4 but it consists of several waves shifted in time which each correspond with the oscillation at the terminals 4. The simplest manner of proving this is to apply a pulsatory oscillation, for example, to the terminals 4. At the instant at which the pulse is produced, both the front face 1a and the rear face 1b of the transducer 1 are excited so that mechanical vibrations are produced at these surfaces. The vibration originating from the face 1a lags with a delay time corresponding with the time required for these vibrations to pass through the body of the transducer 1 behind the vibration originating from the face 1b and propagating in the longitudinal direction 6 of the medium 3. However, a second vibration originates from the latter face which first propagates in the direction of the face 1a of the transducer 1, and is then reflected, whereupon it again lags with a time equal to the time of passage through the transducer 1 behind the vibration originating from the front face 1a. Thus, instead of the single electric input pulse applied to the terminals 4 three successive pulses pass through the medium 3. The transducer 2 converts these mechanical pulses again into a plurality of electrical pulses which appear in order of succession with delay times corresponding with the time of passage through the transducers 1 and 2.

Of course, such echo phenomena are undesrable if the electric signal at the terminals 5 should constitute a reliable simulation of the input signal at the terminals 4. According to the invention, in order to reduce these undesirable vibrations, the polarizable material of the transducers 1 and 2 is polarized so that the polarization gradually decreases parallel to the direction of propagation 6 of the mechanical vibrations. The polarization is at a maximum, for example, at the faces 1a and 2a, respectively, of the transducers 1 and 2 and is substantially zero at the faces 1b and 2b, respectively. Owing to this gradient in the polarization, the mechanical vibrations corresponding with an electric pulse at the terminals 4 are no longer excited at the two end faces 1a and 1b, respectively, but the face 1b gives off a substantially negligible pulse, since at this face the polarization is zero, while the corresponding pulses originating from parts of the transducer 1 lying further inwards are likewise negligible with respect to the pulse originating from the face 1a of this transducer. The echo pulses which consequently could appear in the aforementioned case are now replaced by pulses of very low amplitude distributed over a comparatively long period of time which hardly exert any disturbing influence.

It has been found that the obtained transfer function between the terminals 4 and 5 contains a frequency-dependent factor $$\frac{1}{1+\frac{i\omega p}{4\pi v}}$$

in which $\omega$ denotes the angular frequency, $p$ the periodicity of the combs 11 and 12, respectively, $v$ the rate of propagation of the longitudinal wave and $i$ the imaginary unit, which factor may be corrected, if desired by means of a simple RC-network.

In order to ensure that the polarization of the material of the transducer 1 has the desired gradient, a comparatively high direct voltage is applied to the terminals 4 when a comparatively high temperature slightly lower than the Curie temperature of the transducer material is attained, which results in that a homogeneous electrical polarization is produced in the body of the transducer. When the transducer is then exposed to a temperature gradient in which the temperature at the face 1b is higher than the Curie temperature, whereas the temperature at the face 1a is considerably lower, the polarization in the proximity of the face 1b is completely eliminated while that in the proximity of the face 1a is maintained. Thus, the desired polarization gradient is obtained.

Figure 2:
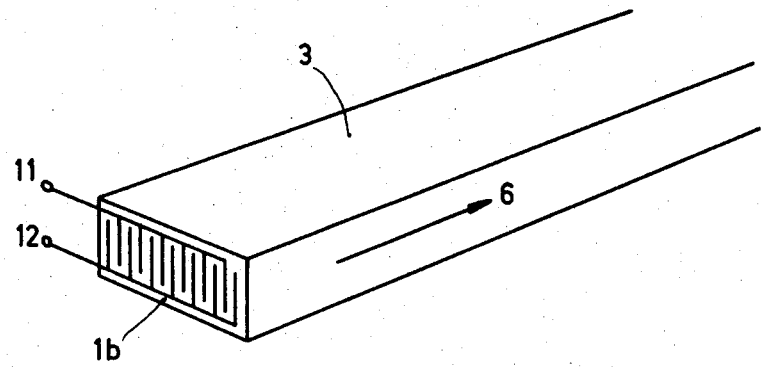

Another very simple arrangement for producing the desired polarization gradient is shown in FIG. 2. Instead of the thin metal electrodes on the faces 1a and 1b of the transducer 1, only the face 1b has provided on it a pair of comb-shaped electrodes 11 and 12. These electrodes are disposed again in the same manner as the metal electrodes described above on the face 1b between the transducer 1 and the delay medium 3. Alternatively, the delay medium 3 itself may consist of polarizable electrostrictive material so that it acts at the same time as a transducer. In order to obtain a polarization gradually decreasing in the direction of propagation 6 of the mechanical vibrations a comparatively high polarization voltage is supplied to the comb-shaped electrodes 11 and 12 again at an increased temperature so that a remanent polarization is maintained in the body. The electric field strength produced between the vertical teeth of the combs lies in a plane at right angles to the direction of these teeth and hence parallel to the direction of propagation 6. Thus strength is at a maximum in the immediate proximity of the surface 1b and, measured in the direction at right angles to the teeth and to the directions 6, its sign is alternately reversed, while it gradually decreases towards the interior of the body of electrostrictive material. If after this electrical and thermal treament, for example, an electric pulse is applied between the electrodes 11 and 12, the mechanical deformation obtained is at a maximum at the surface 1b, as a result of which a pulsatory mechanical vibration appears which propagates in the direction 6. It holds for the material located further inwards that the pulses produced become gradually weaker, which corresponds with the situation as if the undesired pulses initially described having a negligible amplitude are distributed over a comparatively long period of time so that they become less disturbing.

It should be noted that the use of comb-shaped electrodes is known per se in ultrasonic delay devices in order to achieve a frequency dispersion of an input signal. The input signal is converted into mechanical vibrations the direction of propagation of which through the delay medium varies with the input frequency so that at various collecting electrodes on the delay medium various frequency components can be derived from the input signal. In these known devices, the transducer does not contain a material having an electromechanical conversion factor dependent upon the polarization.

Figure 3:
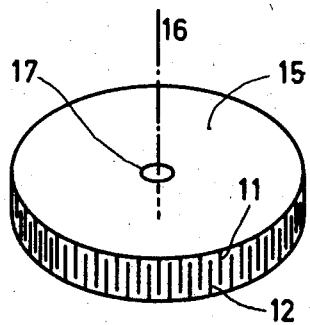

As is apparent from the foregoing, the shape of the delay medium 3 is not essential. Alternatively, under certain conditions, one transducer may be sufficient, for example, when the device is used for radar purposes, in which an electric pulse applied to the input terminals results in a mechanical pulse which passes through the medium 3, is reflected and again strikes the input transducer 1 in which it produces a delayed pulse. In an alternative embodiment, for example, the cylindrical jacket of a cylindrical transducer 15 (FIG. 3) is provided with comb-shaped electrodes of the same kind as the electrodes 11 and 12 of FIG. 2, the teeth of which are parallel to the axis 16 of the cylinder. An electric pulse applied between the electrodes 11 and 12 then produces a mechanical pulse which propagates towards the axis 16 and then reaches again the electrodes 11 and 12 with the required delay time. The cylinder is again made of electrostrictive polarizable material and just as in the case described above the polarization is at a maximum at the jacket. The strong concentration of the mechanical vibrations at the area of the axis 16 may give rise to non-linear phenomena which, for example, in case of a local pre-polarization in the direction of the axis 16 may be detected with the aid of electrodes 17 disposed on the upper face and the lower face of the body 15.

What is claimed is:

1. In an electromechanical transducer for a delay device of the type including a transducer for converting electrical oscillations into mechanical vibrations which are propagated in a delay medium, said electromechanical transducer comprising a body of a material having an electro-mechanical conversion factor dependent upon polarization of the material, said body having a first surface, and a pair of electrodes on said body with at least one of said electrodes being on said surface, and a source of electric oscillations connected to said electrodes whereby said oscillations are converted to mechanical vibrations, the improvement wherein said body is provided with a polarization that gradually decreases in a direction parallel to the direction of propagation of said mechanical vibrations, whereby undesired echo vibrations in said body are substantially reduced.

2. An electromechanical delay device comprising a member for propagating mechanical vibrations with a delay, a source of electric oscillations, and means connecting said source to said member whereby said electric oscillations are converted to mechanical vibrations propagating in said member, wherein at least a part of said member is comprised of a body of a material having an electromechanical conversion factor dependent upon polarization of the material, said body having a first surface, said means connecting said source to said member comprising a pair of electrodes connected to said body with at least one of said electrodes being connected to said surface, said body having a polarization that gradually decreases in a direction parallel to the direction of propagation of mechanical vibrations in said member.

3. The delay device of claim 2 in which said body comprises one end of said member, and an electromechanical transducer is provided at the other end of said member, said body having a second surface parallel to said first surface, said first and second surfaces being normal to the direction of propagation of mechanical vibrations in said member, the other of said electrodes being connected to said second surface, the polarization of said body being maximum at said first surface and minimum at said second surface.

4. The delay device of claim 3 in which said member comprises a delay medium extending between said second surface and said electromechanical transducer.

5. The delay device of claim 2 in which said electrodes are comb-shaped electrodes and are both connected to said first surface, with the teeth of said electrodes being intermeshed.

6. The delay device of claim 2 in which said member is comprised substantially completely of a rectilinear body of said material, said first surface being an end surface of said rectilinear body, and said electrodes are comb-shaped electrodes and are both connected to said first surface, the teeth of said electrodes being intermeshed, the polarization of said rectilinear body being maximum at said first surface, and decreasing gradually toward the opposite end of said rectilinear body.

7. The delay device of claim 2 in which said member is a cylindrical body comprised substantially completely of said material, said first surface being the curved surface of said cylindrical body, and said electrodes are comb-shaped electrodes on said first surface, the teeth of said electrodes being intermeshed and extending parallel to the axis of said cylindrical body, the polarization of said cylindrical body being a maximum at its curved surface and gradually decreasing toward the center.

8. The delay device of claim 7 comprising a second pair of electrodes connected between the upper and lower faces of said cylindrical body substantially at the axis thereof.

No references cited.

ROY LAKE, *Primary Examiner.*

DARWIN R. HOSTETTER, *Examiner.*